United States Patent [19]
Homburg et al.

[11] Patent Number: 5,199,014
[45] Date of Patent: Mar. 30, 1993

[54] TWO AXIS ELECTRO-OPTICAL SCANNING DEVICE HAVING ORTHOGONAL COILS SHARING ONE AIR GAP

[75] Inventors: Fredericus G. A. Homburg; Bernardus J. Stinesen, both of Eindhoven, Netherlands

[73] Assignee: U.S. Philips Corporation, New York, N.Y.

[21] Appl. No.: 662,044

[22] Filed: Feb. 28, 1991

[30] Foreign Application Priority Data

Jun. 29, 1990 [NL] Netherlands .................... 9001492

[51] Int. Cl.$^5$ .............................................. G11B 7/09
[52] U.S. Cl. .................................. 369/44.15; 369/112; 359/814; 359/824
[58] Field of Search ................. 369/44.14, 44.15, 44.16, 369/44.22, 112; 359/813, 814, 823, 824

[56] References Cited

U.S. PATENT DOCUMENTS

| | | | |
|---|---|---|---|
| 4,321,701 | 3/1982 | Arquie et al. ................. | 369/44.22 |
| 4,443,721 | 4/1984 | Jansen . | |
| 4,988,165 | 1/1991 | Ishii et al. . | |
| 5,018,836 | 5/1991 | Noda et al. .................. | 369/44.16 X |
| 5,072,433 | 12/1991 | Tanaka ........................ | 369/44.16 |
| 5,073,883 | 12/1991 | Mitsumori .................... | 369/44.15 |

FOREIGN PATENT DOCUMENTS 0212941 3/1987 European Pat. Off. .
0348845 1/1990 European Pat. Off. .
9101549 2/1991 PCT Int'l Appl. .

Primary Examiner—Wayne R. Young
Attorney, Agent, or Firm—David R. Treacy

[57] ABSTRACT

A scanning device comprises a lens (2) having an optical axis (2a). The lens is movable in a focussing direction (F) to form at least one radiation spot on a surface to be scanned and in a tracking direction (T) oriented transversely of the focussing direction, in order to follow a recording track. The scanning device comprises a stationary section (16) with a magnetic circuit and one air gap (20), and a section (6) which includes the lens and is movable relative to the stationary section. The movable section comprises at least one focussing coil (12) and two tracking coils (14a, 14b) for driving the lens, the focussing coil having a coil axis (12a) extending parallel to the optical axis. The air gap is situated between the optical axis of the lens and the coil axis of the focussing coil. The movable section is secured to the stationary section by a compliant mechanical suspension (22a, 22b), and its mass center is situated in or at least near the air gap.

18 Claims, 2 Drawing Sheets

TWO AXIS ELECTRO-OPTICAL SCANNING DEVICE HAVING ORTHOGONAL COILS SHARING ONE AIR GAP

BACKGROUND OF THE INVENTION

The invention relates to an electro-optical scanning device comprising a movable lens having an optical axis, which lens is movable in a focussing direction to form at least one radiation spot on a surface to be scanned and in a tracking direction oriented transversely of the focussing direction, in order to follow a recording track in said surface, and comprising a stationary section with a magnetic circuit and with an air gap extending in a plane defined by the focussing direction and the tracking direction, and a section which is movable relative to the stationary section and comprising said lens, which movable section comprises at least one focussing coil and at least one tracking coil for driving the lens, which coils extend into the air gap.

Such a scanning device is known from U.S. Pat. No. 4,321,701 (herewith incorporated by reference). The known electro-optical scanning device comprises a stationary section with a single magnetic air gap and a vertically disposed movable section. The movable section, which is guided relative to the stationary section via an intermediate body, comprises a plate-shaped body which extends in the air gap and, secured to this body, a holder for a lens and any other optical elements. The holder is positioned in such a way relative to the plate-shaped body that the optical axis of the lens is situated in the plane of the plate-shaped body. Vertical current conductors serving as tracking coils are arranged at two opposite edges of the plate-shaped body. A focussing coil mounted on the plate-shaped body and having a coil axis oriented transversely of the optical axis of the lens is arranged between said conductors.

A drawback of the known scanning device is that, as a result of the presence of the vertically disposed plate-shaped body and as a result of the unfavourable arrangement of the plate-shaped body and the lens holder relative to each other, the movable section has a large dimension viewed along the optical axis of the lens. Therefore, the prior-art scanning device has a substantial overall height, which renders the device unsuitable for use in modern optical disc players of small height. Another disadvantage of the prior-art scanning device is the comparatively intricate method of manufacturing the composite plate-shaped body. Moreover, it has been found that in practice the mutual arrangement of the lens and the coils is inconvenient and imposes undesirable constructional limitations.

SUMMARY OF THE INVENTION

It is an object of the invention to improve the scanning device of the type defined in the opening paragraph in such a manner that an easy-to-manufacture scanning device of suitable shape and having a small overall height can be obtained.

To this end the scanning device in accordance with the invention is characterized in that the focussing coil has a coil axis extending parallel to the optical axis, the single air gap is situated between the optical axis of the lens and the coil axis of the focussing coil, and the mass center of the movable section, which section extends in a direction oriented transversely of a plane defined by the focussing direction and the tracking direction and is secured to the stationary section by a compliant mechanical suspension, is situated in or at least near the air gap.

In the scanning device in accordance with the invention the lens is disposed in a cantilevered relationship to the coils. This has the advantage that when the scanning device is incorporated in an optical player, for example a CD player or a DATA player, a suitable space is obtained to accommodate optical components, such as a semiconductor laser, which cooperate with the scanning device. The scanning device in accordance with the invention also enables a compact construction to be obtained, specifically the small dimension in a direction viewed along the optical axis being very advantageous. As a result of the special arrangement of the focusing coil this coil provides a counterpoise for the lens and lens-suspension part of the movable section of the scanning device, thereby enabling a well-balanced construction to be obtained in a simple manner. The point of application of the driving forces is then situated in or near the mass centre of the movable section, so as to preclude the occurrence of parasitic resonances. Another advantage of the scanning device in accordance with the invention is that the scanning device can be manufactured from a comparatively small number of easy to assemble parts.

An embodiment of the electro-optical scanning device in accordance with the invention, in which the air gap is bounded by a magnet having a magnet axis which is oriented transversely of a plane defined by the focussing direction and the tracking direction, is characterized in that the focussing coil surrounds the magnet. In this way a small distance can be obtained between the optical axis of the lens and the coil axis of the focussing coil, which is important for the stiffness of the movable section. A high stiffness of the movable section is desirable in order to achieve that possible parasitic resonances of the lens are situated in a high frequency range.

An embodiment of the scanning device in accordance with the invention is characterized in that the suspension comprises suspension rods which extend in a direction oriented transversely of the plane defined by the focussing direction and the tracking direction, which suspension rods are each secured to the stationary section and the movable section at a first end and a second end respectively, said ends being provided with an integral hinge allowing movements about an axis which extends in the focussing direction and about an axis which extends in the tracking direction.

An advantage of this embodiment is that it allows such a stiffness to be selected for the suspension that any resonant frequencies resulting from a possible unbalance are low in relation to the desired bandwidth of the control system. This suspension can be manufactured by means of an injection-moulding process and can be mounted in a simple manner.

In order to obtain a translational movement of the lens in the tracking direction, an embodiment of the scanning device in accordance with the invention is characterized in that the suspension rods extend parallel to one another.

A practical embodiment is characterized in that the hinges used in the suspension are constructed as double integral hinges.

Another practical embodiment is characterized in that the number of suspension rods is four, the rods at opposite sides of the plane defined by the optical axis of the lens and the coil axis of the focussing coil being arranged in pairs which form part of a single injection-moulded product. An embodiment which is attractive from the point of view of production-engineering is characterized in that the movable section comprises a separately formed lens holder and coil holder. During manufacture the lens holder and the coil holder can be provided independently of one another with the lens and the coils respectively. Subsequently, the lens holder and the coil holder can be secured to one another, for example by means of snapped connections, ultrasonic welding or cementing.

For reasons of symmetry the electro-optical scanning device in accordance with the invention will generally comprise two tracking coils. In order to avoid that during production of such a scanning device separate coils have to be handled and mounted, an embodiment is characterized in that the coil holder is assembled from a focussing-coil holder, provided with the focussing coil, and two tracking-coil holders, each provided with a tracking coil.

It is to be noted that European Patent Application 0,212,941 (herewith incorporated by reference) discloses an electro-optical scanning unit having an objective lens secured to a frame via a plastics suspension. The suspension allows translational movements of the lens in the focussing direction and rotary movements of the lens to provide tracking movements. The known unit further comprises a double drive system provided with a magnet, a focussing coil and two tracking coils arranged at two opposite sides of the suspension, the coils being disposed in comparatively wide magnetic air gaps. An electro-optical scanning unit comprising a double drive system is also known from European Patent Application 0,348,845 (herewith incorporated by reference). In this unit an objective lens is accommodated in a lens holder which is secured to a frame by means of two pairs of blade springs. The drive system comprises two sets of coils which are arranged in line viewed in the longitudinal direction of the blade springs, each set comprising one focussing coil and two tracking coils.

The invention also relates to an optical player comprising a scanning device in accordance with the invention, a turntable and a slide, the slide being movable along a radial path relative to the turntable, and the plane defined by the optical axis of the objective and the coil axis of the focussing coil being perpendicular to said radial path.

The invention will now be described in more detail, by way of example, with reference to the drawings.

DESCRIPTION OF THE PREFERRED EMBODIMENT

Figure 1:
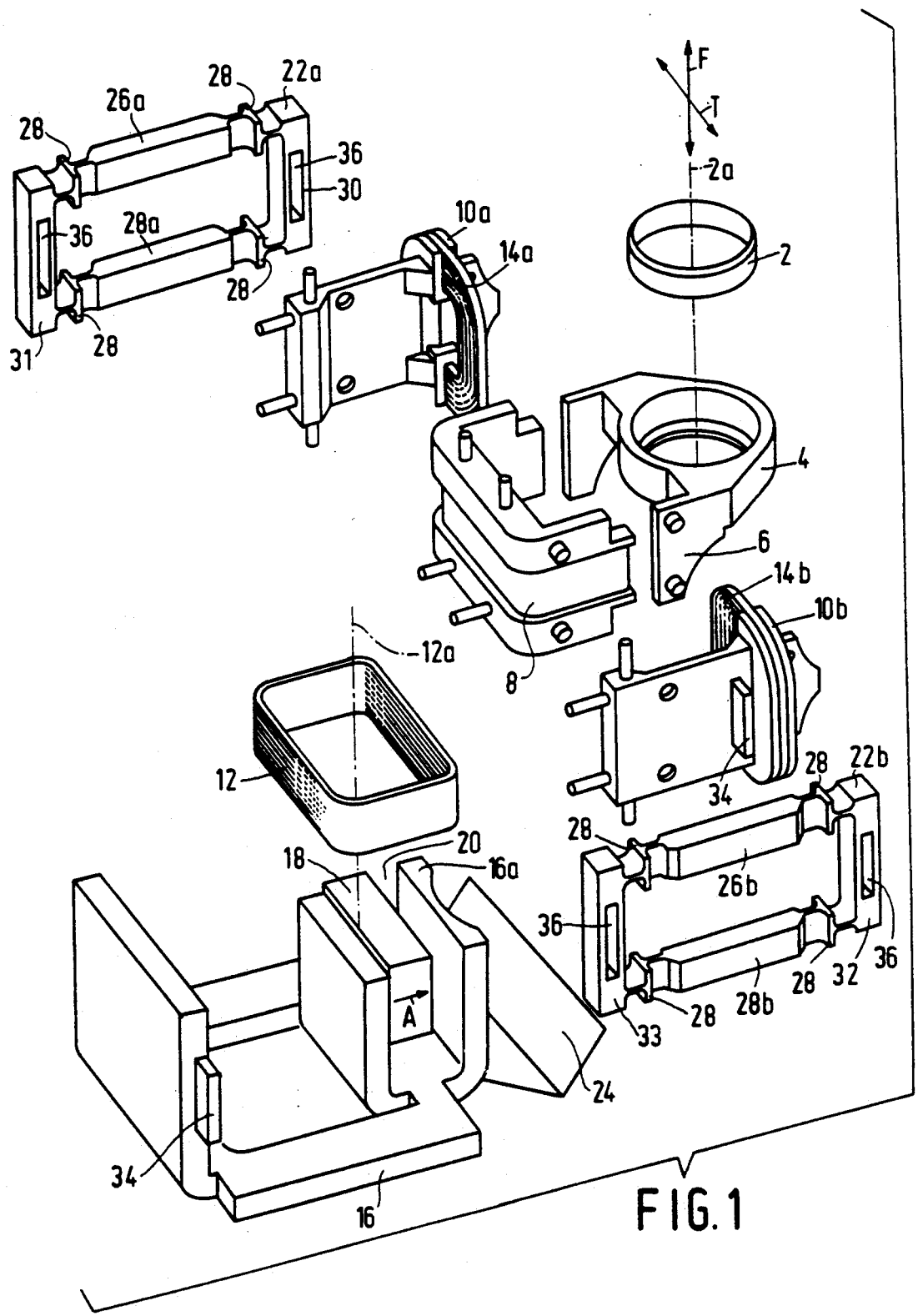
FIG. 1 is an exploded view of an embodiment of the scanning unit in accordance with the invention.
Figure 2:
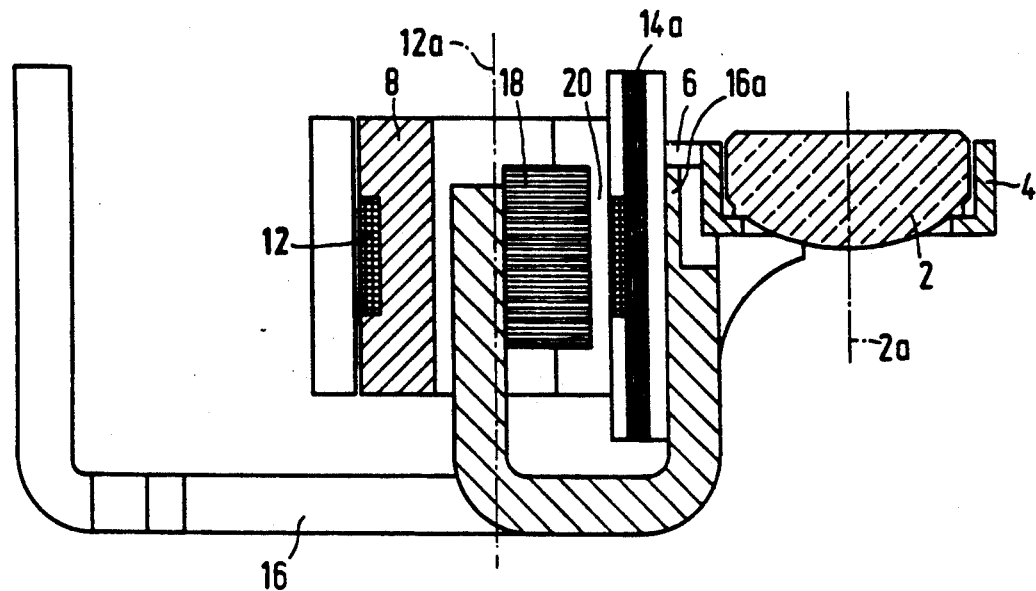
FIG. 2 is a sectional view of the embodiment shown in FIG. 1, and comprising a device in accordance with the invention.

The electro-optical scanning device in accordance with the invention shown in FIGS. 1 and 2 is referred to as a "2D-actuator" and is intended for use in CD decks constructed for two-stage radial tracking of optical discs, for example CDs of 8 cm or 12 cm. In such a deck an objective can be translated along a radial path relative to a disc which is rotatable about an axis of rotation. For this purpose the deck comprises, for example, a translatable slide carrying the scanning device. An information track of a rotating disc can be inscribed and/or read without mechanical contact by means of a radiation beam produced by a laser.

The scanning device in accordance with the invention is constructed in such a manner that the production process can be almost fully mechanized for large-quantity production at minimal costs. The scanning device is particularly suitable for use in so-called "slim-line" equipment.

The scanning device comprises an objective lens 2 mounted in a lens holder 4 and having an optical axis 2a. The lens holder 4 forms part of a movable section 6 of the scanning device, the movable section further comprising a focussing-coil holder 8 and two tracking-coil holders 10a and 10b. The coil holders 8, 10a and 10b are interconnected and connected to the lens holder 4, in the present example by means of snap-in connections. The focussing-coil holder 8 comprises a focussing coil 12 having a coil axis 12a which extends parallel to the optical axis 2a. The tracking-coil holders 10a and 10b each comprise a tracking coil 14a and 14b respectively.

The scanning device in accordance with the invention further comprises a stationary section 16, which comprises a permanent magnet 18 and ferromagnetic portions. The magnet 18, which has been magnetized in a direction indicated by an arrow A, forms a magnetic circuit with the ferromagnetic portions of the stationary section 16, a magnetic air gap 20 extending between the magnet 18 and one of the ferromagnetic portions 16a.

The movable section 6 is movably secured to the stationary section 16 by means of a two-part suspension 22a, 22b, the focussing coil 12 and the tracking coils 14a and 14b extending partly in the air gap 20. The movable section, in particular the lens 2, is movable relative to the stationary section in a focussing direction, indicated by a double arrow F, and in a tracking direction, indicated by a double arrow T.

When the scanning device in accordance with the invention is employed in a device for translating an objective along a radial path relative to a rotating disc, the laser, generally a semiconductor laser, can be arranged underneath or beside the scanning device, as required. In the last-mentioned case a mirror 24 placed underneath the lens 2 is arranged in the light path.

The suspension 22a, 22b comprises four suspension rods 26a, 28a, 26b and 28b, which are preferably made of a plastics, which are arranged in pairs and which each have a double integral hinge 28 at their respective ends. The lens 2 has a neutral position, in which the suspension rods 26a, 28a, 26b and 28b extend in a direction oriented in a plane defined by the focussing direction F and the tracking direction T. The suspension rods 26a and 28a together with two connecting portions 30 and 31 form one integral injection-moulded product. An identical product is formed by the suspension rods 26b and 28b and two connecting portions 32 and 33. The parallel suspension rods are secured to the movable section 6 and the stationary section 16 by means of the connecting portions 30 and 32 and the connecting portions 31 and 33 respectively, projections 36 of the sections 6 and 16 engaging in recesses 38 of the portions 30, 32 and 31, 33 respectively. The double integral hinges 28 allow both movements about an axis which extends in a focussing direction F and in a tracking direction T.

As a result of the suspension which is used the focussing movements and the tracking movements are translational movements. An advantage of this is that a satisfactory compromise is obtained between the susceptibility to shocks produced outside the slide carrying the scanning device and the susceptibility to disturbances originating from the slide itself. This is of particular importance if a slide-drive system is employed. The suspension itself is particularly advantageous on account of its inherent damping characteristics and its simple manufacturing and assembly possibilities. In the assembled condition the scanning device in accordance with the invention is arranged on the slide in such a manner that the magnetic air gap 20 extends tangentially of the disc to be scanned.

It has been found by experiment that both in the tracking direction and in the focussing direction the scanning device in accordance with the invention enables a high efficiency to be attained as a result of a comparatively small movable mass and a satisfactory ratio between driving forces and the electric currents applied to the coils. Consequently, the scanning device in accordance with the invention is very suitable for low-power uses.

Figure 3:
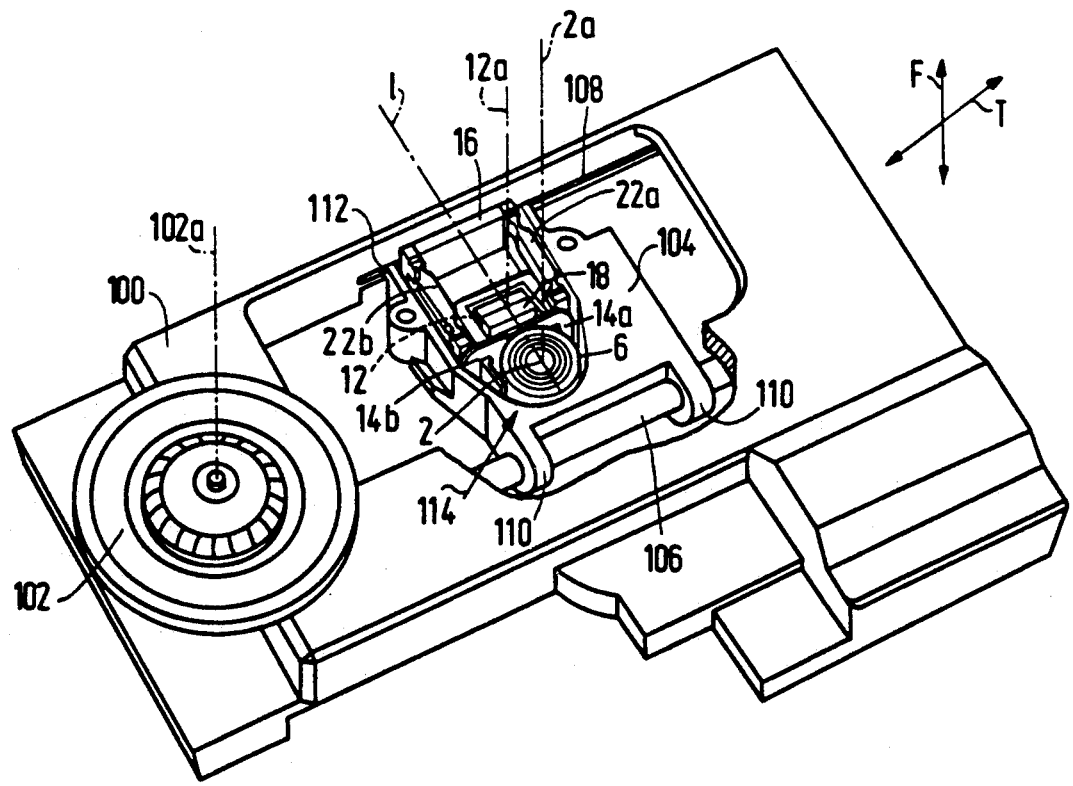

FIG. 3 shows a part of a CD player, in particular the player deck, employing an embodiment of the device in accordance with the invention. In the description of the present embodiment parts corresponding to those in the embodiment already described bear the same reference numerals.

The deck shown in FIG. 3 comprises a chassis 100 in which an electrically drivable turntable 102 for supporting and centering an optical disc having an information track, for example a CD, is supported so as to be rotatable about an axis of rotation 102a. The deck further comprises mechanical guide means for translating a slide 104 radially relative to the turntable 102 (as indicated by the arrow T). The guide means comprise a guide rod 106, which is secured to the chassis 100, and a guide wall 108 for cooperation with sliding bushes 110 and sliding surfaces 112 respectively of the slide 104. An electric motor, not shown, which is supported in the chassis, serves for driving the slide 104, which may be effected by means of a transmission mechanism.

The slide 104 carries an embodiment 114 of the scanning device in accordance with the invention and, consequently, of a type as shown in FIGS. 1 and 2, and a semiconductor laser arranged beside the scanning device 114. The scanning device 114 comprises a movable section 6, which comprises an objective 2 having an optical axis 2a parallel to the axis of rotation 102a, a focussing coil 12 having a coil axis 12a, and two tracking coils 14a, 14b. A suspension 22a, 22b connects the movable section 6 to a stationary section 16 of the scanning device, which stationary section is connected to the slide 104 and comprises a magnetic circuit with a permanent magnet 18. The scanning device is positioned in such a way relative to the slide 107 that its longitudinal axis 1 is oriented transversely of the plane defined by the axis of rotation 102a and the optical axis 2a, so that the objective 2 is movable both in the focussing direction F and in the tracking direction T.

In operation the slide 104 is moved along a radial path, indicated by the arrow T, relative to the axis of rotation 102a of the turntable 102 for the purpose of coarsely following the information track of the rotating disc, which track is situated in an information plane. Since the track may be slightly off-centred on the optical disc which has been clamped onto the turntable and the turntable may also exhibit slight radial deviations, allowance is made for small radial excursions of the information track during rotation. Any deviations which in operation may arise between the position of the scanning spot formed in the disc by the objective and the track portion to be scanned are reduced by means of a radial tracking system comprising the scanning device 114, in that the objective 2 performs small high-frequency tracking movements in the direction indicated by the arrow T.

We claim:

1. An electro-optical scanning device comprising:
   a movable lens having an optical axis, said lens being movable in a focussing direction to form at least one radiation spot on a surface to be scanned, and movable in a tracking direction oriented transversely of the focussing direction to follow a recording track in said surface,
   a stationary section including a magnetic circuit and an air gap extending in a plane defined by said focussing direction and said tracking direction, and a movable section movable with respect to said stationary section, said movable section carrying said lens and comprising at least one focussing coil and at least one tracking coil for driving said lens, each of said coils extending into said air gap, characterized in that
   the focussing coil has a coil axis extending parallel to said optical axis,
   the air gap is situated between the optical axis and said coil axis,
   the device includes a compliant mechanical suspension securing the movable section to the stationary section, and
   said movable section extends in a direction oriented transversely of said plane defined by the focussing direction and the tracking direction, and has a mass center situated in or near the air gap.

2. An electro-optical scanning device as claimed in claim 1, in which the air gap is bounded by a magnet having a magnet axis which is oriented transversely of said plane defined by the focussing direction and the tracking direction, characterized in that the focussing coil surrounds the magnet.

3. An electro-optical scanning device as claimed in claim 2, characterized in that the suspension comprises suspension rods which extend in a direction oriented transversely of the plane defined by the focussing direction and the tracking direction, which suspension rods are each secured to the stationary section and the movable section at a first end and a second end respectively, said ends being provided with an integral hinge allowing movements about an axis which extends in the focussing direction and about an axis which extends in the tracking direction.

4. An electro-optical scanning device as claimed in claim 3, characterized in that the suspension rods extend parallel to one another.

5. An electro-optical scanning device as claimed in claim 4, characterized in that the hinge is constructed as a double integral hinge.

6. An electro-optical scanning device as claimed in claim 5, characterized in that the number of suspension rods is four, the rods at opposite sides of the plane defined by the optical axis of the lens and the coil axis of the focussing coil being arranged in pairs which form part of a single injection-moulded product.

7. An electro-optical scanning device as claimed in claim 4, characterized in that the movable section comprises a separately formed lens holder and coil holder.

8. An electro-optical scanning device as claimed in claim 7, comprising two tracking coils, characterized in that the coil holder is assembled from a focussing-coil holder, provided with the focussing coil, and two tracking-coil holders, each provided with a tracking coil.

9. An electro-optical scanning device as claimed in claim 3, characterized in that the number of suspension rods is four, the rods at the opposite sides of the plane defined by the optical axis of the lens and the coil axis of the focussing coil being arranged in pairs which form part of a single injection-molded product.

10. An electro-optical scanning device as claimed in claim 1, characterized in that the suspension comprises suspension rods which extend in a direction oriented transversely of the plane defined by the focussing direction and the tracking direction, which suspension rods are each secured to the stationary section and the movable section at a first end and a second end respectively, said ends being provided with an integral hinge allowing movements about an axis which extends in the focussing direction and about an axis which extends in the tracking direction.

11. An electro-optical scanning device as claimed in claim 10, characterized in that the number of suspension rods is four, the rods at the opposite sides of the plane defined by the optical axis of the lens and the coil axis of the focussing coil being arranged in pairs which form part of a single injection-molded product.

12. An electro-optical scanning device as claimed in claim 10, characterized in that the movable section comprises a separately formed lens holder and coil holder.

13. An electro-optical scanning device as claimed in claim 12, comprising two tracking coils, characterized in that the coil holder is assembled from a focussing-coil holder, provided with the focussing coil, and two tracking-coil holders, each provided with a tracking coil.

14. An electro-optical scanning device as claimed in claim 1, characterized in that the movable section comprises a separately formed lens holder and coil holder.

15. An electro-optical scanning device as claimed in claim 14, comprising two tracking coils, characterized in that the coil holder is assembled from a focussing-coil holder, provided with the focussing coil, and two tracking-coil holders, each provided with a tracking coil.

16. An optical player comprising a turntable, a slide and an electro-optical scanning device comprising:
   a movable lens having an optical axis, said lens being movable in a focussing direction to form at least one radiation spot on a surface to be scanned, and movable in a tracking direction oriented transversely of the focussing direction to follow a recording track in said surface,
   a stationary section including a magnetic circuit and an air gap extending in a plane defined by said focussing direction and said tracking direction, and
   a movable section movable with respect to said stationary section, said movable section carrying said lens and comprising at least one focussing coil and at least one tracking coil for driving said lens, each of said coils extending into said air gap,
   said slide being movable along a radial path relative to the turntable and the plane defined by the optical axis of the lens and the coil axis of the focussing coil being perpendicular to said radial path, characterized in that:
   the focussing coil has a coil axis extending parallel to said optical axis,
   the air gap is situated between the optical axis and said coil axis,
   the device includes a compliant mechanical suspension securing the movable section to the stationary section, and
   said movable section extends in a direction oriented transversely of said plane defined by the focussing direction and the tracking direction, and has a mass center situated in or near the air gap.

17. A player as claimed in claim 19, characterized in that the suspension comprises suspension rods which extend in a direction oriented transversely of the plane defined by the focussing direction and the tracking direction,
   said rods being each secured to the stationary section and the movable section at a first end and a second end respectively, each said end including an integral hinge allowing movements about an axis which extends in the focussing direction and about an axis which extends in the tracking direction.

18. A player as claimed in claim 16, characterized in that the suspension comprises four suspension rods which extend in a direction oriented transversely of the plane defined by the focussing direction and the tracking direction,
   said rods being each secured to the stationary section and the movable section at a first end and a second end respectively, each said end including an integral hinge allowing movements about an axis which extends in the focussing direction and about an axis which extends in the tracking direction, and
   the rods at the opposite sides of said plane being arranged in pairs which form part of a single injection-molded product.

* * * * *